UNCONSOLIDATED SAND PARTICLES

CONSOLIDATION BY IN SITU FORMATION OF A SILICATE BOND

CONSOLATION BY COATING OF BONDING MATERIAL PRIOR ART METHOD

INVENTOR.
GEORGE P. MALY
BY
Jack M. Miller
ATTORNEY

United States Patent Office 3,306,355
Patented Feb. 28, 1967

3,306,355
FORMATION CONSOLIDATION
George P. Maly, Fullerton, Calif., assignor to Union Oil Company of California, Los Angeles, Calif., a corporation of California
Filed June 9, 1964, Ser. No. 373,722
10 Claims. (Cl. 166—29)

This invention relates generally to the treatment of fluid producing formations wherein the fluid producing formation is an unconsolidated or poorly consolidated sand. More particularly, the invention relates to a new and improved method for consolidating loose formations by binding loose particles together while maintaining a substantially high degree of permeability and porosity in the formation.

Difficulty is usually experienced in the production of formation fluids from producing formations composed of either unconsolidated sand or loosely consolidated sandstone. Unconsolidated sands in a production zone cause many severe problems in the completion and production of such formations. The production of fluids from incompetent formations results in the simultaneous production of sand particles which fill the well bore and restrict fluid production. Furthermore, the production of sand along with formation fluids damages the pumps and fluid lines because of the erosive nature of the sand particles.

The use of various materials such as resins and silicates for the purpose of sand consolidation in oil, gas, and water wells has been practiced for many years. While some sand consolidation has been achieved in some wells, complete failure has resulted in many other wells using prior art sand consolidation techniques. Failures have usually resulted from either not obtaining consolidation of the sand or in obtaining consolidation at the sacrifice of reducing the permeability and porosity of the formation to an unusable level. Of course, too great a reduction in permeability is very costly since expensive procedures are required to restore permeability to the formation.

In general, the prior art has used a technique of coating sand grains with a thick layer of material such as a resin or silicate to bind the sand grains together. However, this prior art coating, if effective at all as a binder, is relatively thick and always reduces the volume of the pore spaces between the sand grains to the point that there is a substantial reduction in permeability for production purposes. Furthermore, because of the inherent lack of cleanliness of the surface of the sand grains in an oil and/or gas producing formation, even after attempted cleaning, the bonding between the sand particles and the binder is never complete nor particularly strong since the sand grains do not react with the bonding material. Thus, the techniques that have been used in the past usually have failed to produce the desired consolidation and/or have reduced the permeability of the sand to an unsatisfactory low value.

It is accordingly a principal object of the present invention to provide an improved method of consolidating incompetent oil and gas formations.

It is a further object of my invention to provide an improved method for consolidating loose sand formations while retaining a high degree of porosity and permeability in the consolidated sand formation.

Another object of my invention is to provide an improved method of bonding sand particles whose surfaces are contaminated.

Other objects and advantages of my invention will be apparent to those skilled in the art as the description of the invention proceeds.

I have found that the foregoing objectives and their attendant advantages can be realized by injecting into an incompetent formation a strong alkali metal hydroxide solution, e.g., aqueous sodium hydroxide, permitting this caustic alkali solution to clean and react with the surface of the sand particles to form a thin layer of silicates, e.g., sodium silicate. The unreacted caustic alkali solution is then preferably displaced by fluid injection, e.g., flushing with air, some other inert gas, or washing with a dehydrating solvent such as alcohol or some other polar solvent. However, this flushing step may be eliminated with satisfactory results. The sand particles with the thin layer of sodium silicate which was formed in situ is then treated with an acid, e.g., hydrochloric acid, and then at least partially dehydrated by fluid injection to form silicon dioxide or some other water-insoluble silicon compound. The formation can then be water washed to remove any excess acid and the well produced in the conventional manner, or the well can be produced immediately without water washing thus producing any excess acid with the initial formation fluids. One of the major advantages of my process is that I use low viscosity fluids, usually in the range of one centipoise, for both the caustic and acid treatment steps of my invention. The use of those low viscosity fluids is instrumental in minimizing fingering through heterogeneous formations during injection, thus insuring even and uniform consolidation treatment of the formation surrounding a well bore.

My invention will be more readily understood by reference to the accompanying drawings which form a part of this application.

Figure 1:
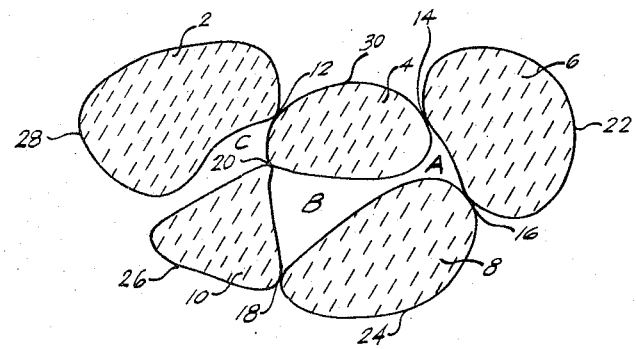
FIGURE 1 is an enlarged cross-sectional representation of several untreated sand grains in an earth formation.
Figure 2:
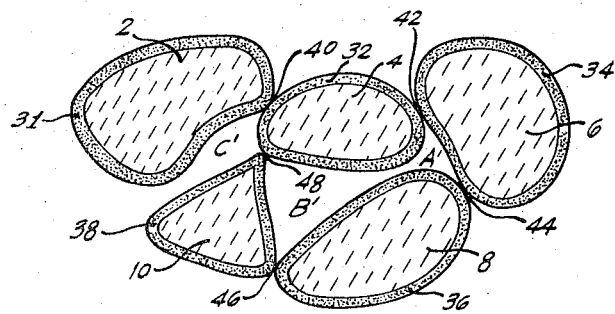
FIGURE 2 is an enlarged cross-sectional representation of the same sand grains illustrated in FIGURE 1 consolidated by the practice of my invention.
Figure 3:
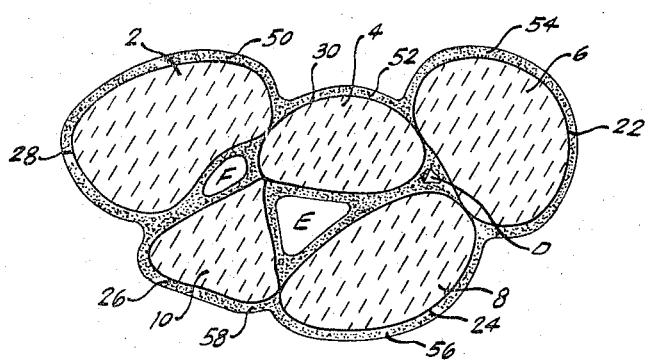
FIGURE 3 is an enlarged cross-sectional representation of the same sand grains illustrated in FIGURE 1 consolidated by the coating technique of the prior art.

The results of the microscopic study of unconsolidated cores, cores consolidated by the method of my invention, and cores consolidated by the prior art coating technique are represented by the depictions of FIGURES 1, 2 and 3, respectively. In FIGURE 1 the unconsolidated sand particles 2, 4, 6, 8 and 10 have several point contacts with each other as shown at 12, 14, 16, 18, and 20. The surfaces 28, 30, 22, 24, and 26 of particles 2, 4, 6, 8, and 10 are represented as having a relatively even and smooth configuration. However, those surfaces actually are quite irregular and rough when examined microscopically. Void spaces A, B, and C are formed by the spacing and configuration of particles 2, 4, 6, 8, and 10.

FIGURE 2 illustrates the same sand particles 2, 4, 6, 8 and 10 as shown in FIGURE 1 after consolidation by the in situ point fusion technique of my invention. Thin, in some cases microscopic, layers of insoluble silicate have been formed, shown by layers 31, 32, 34, 36, and 38, by reaction into the surfaces 28, 30, 22, 24, and 26. Note particularly that void spaces A', B' and C' are substantially the same size as the original void spaces A, B, and C of the unconsolidated sand. Particles 2, 4, 6, 8, and 10 are fused together only at the points of contact 40, 42, 44, 46, and 48. Typically, at the locations where particles 4 and 8 and particles 2 and 10 come in close proximity to each other but do not touch, there is no fusion of the sand particles thus leaving substantially all original void spaces unfilled.

The prior art coating technique is illustrated in FIGURE 3 where the same sand particles 2, 4, 6, 8, and 10 as shown in FIGURE 1 are consolidated by coating the surfaces 28, 30, 22, 24, and 26 with thick layers of coating material such as a resin or a sodium silicate which has then been treated to bind the particles together. Here the additional layers 50, 52, 54, 56, and 58 on top of surfaces 28, 30, 22, 24, and 26 almost fill the void spaces. Note that void spaces A, B, and C of the unconsolidated particles shown in FIGURE 1 have been reduced greatly in size leaving the very small voids D, E, and F in place of the original voids A, B, and C, respectively.

Prior art sand consolidation agents such as resin binders usually are effective only when applied to sand formations which have been made substantially devoid of water, residual crude oils, clays, carbonates, or other detrimental residues, but this condition of cleanliness and dehydration is not obtainable in field operations. However, while in my process the cleanliness of the formation may increase the effectiveness of the in situ formation of silicates, it is not critical to my method and excellent consolidation of a formation can be accomplished even with a substantially dirty sand formation surrounding the oil well. Further, water is not detrimental to my first necessary treatment step (caustic injection) so dehydration is not required. Optionally, the initial step of my improved method of incompetent formation treatment can be to clean the sand grains and/ or particles of the incompetent formation for a desired distance from the well bore. This can be accomplished by conducting in situ combustion, by subjecting the formation around the well bore to a solvent or detergent wash, or by similar processing for cleaning the sand particles in the formation adjacent the well bore.

The cleaned or uncleaned unconsolidated sand of the formation, as shown in FIGURE 1, is first injected with a suitable alkali metal hydroxide solution such as aqueous sodium hydroxide. This caustic alkali solution is injected through the well bore under pressure by conventional means in sufficient amounts to extend throughout the incompetent formation surrounding the well bore to the desired distance. Pressure is then maintained on the formation and the injected caustic solution is permitted to react with the sand particles. A sufficient period of time is needed to form an in situ silicate reaction product with the surface of the sand particles subjected to contact by the caustic alkali solution. This period of time, depending upon the temperature, pressure, and cleanliness of the sand particles, can range anywhere from a half hour or less to 24 hours or more. However, usually the time period for in situ silicate formation is about 12 hours. The temperature of the formation being treated will run from about 35° F. to as high as 400° F. and higher, but the temperature is not critical as long as there is sufficient in situ silicate formation and the formation can be preheated or not as desired. Since each sand material or formation has properties peculiar to its chemical composition and silicate form, it is preferable to obtain a sample of the sand to be consolidated and determine by judicious reasoning and experiment such variables as the appropriate concentration of caustic alkali solution, the temperature, and time to obtain the desired reaction with the sand particles.

Typical aqueous caustic alkali concentrations used in my invention are from about 5 percent to about 50 percent or higher by weight of alkali metal hydroxide. However, this concentration is not critical and depends partially upon the amount of residual water in the formation, the desired distance of penetration into the formation, and many other similar factors. The only requirement as to caustic alkali concentration is that there be sufficient caustic alkali present to form a silicate reaction product with the surface of the sand particles. While most of the description herein is related to sodium hydroxide as the basic solution, it is to be understood that any alkali metal hydroxide, i.e., hydroxides of lithium, sodium, potassium, rubidium, and cesium, can be used, either alone or in combination with other alkali metal hydroxides, to form the basic solutions used in my invention. Sodium hydroxide is preferred because of low cost.

Subsequent to the formation of the silicate reaction product at the surface of the sand particles, a dehydrating fluid such as air, which is preferred, or another non-reactive gas is injected throughout the treated formation thus effecting a partial drying of the sodium silicate formed in situ on the surface of the sand particles. It is also satisfactory to flush and dry the sand particles after in situ formation of the silicate reaction product by injecting a dehydrating solvent or fluid such as alcohol, glycol, acetone, and the like, and then if desired injecting a small amount of gas to remove the remaining solvent. This dehydrating flushing step thus removes most of the excess caustic solution and further dehydrates the silicate film preparatory to acid treatment. However, it is satisfactory to eliminate this flushing and dehydrating step by following the caustic alkali solution treatment with the subsequent acid treatment. Usually, the consolidation bonds formed are somewhat stronger when the above dehydrating step follows the caustic alkali injection, but the resulting sand formation, with or without the flushing and dehydrating step, is much stronger and more porous and permeable than formations consolidated using prior art coating or layer techniques.

Thereafter, an acid, preferably a strong mineral acid, such as hydrochloric acid in the aqueous or anhydrous gaseous state, is injected into the formation where it neutralizes any residual caustic alkali present and reacts with the alkali metal silicate reaction product created in situ in the previous caustic alkali treatment step. A further preferred acid is one which contains silica, e.g., fluosilicic acid, which minimizes the dissolution of the alkali metal silicate which has been formed on the surface of the sand particles. A still further preferred acid is a mixture comprising hydrochloric acid, fluosilicic acid, and phosphoric acid. A particularly successful mixture is one comprising each of the above three acids. Other suitable acids include hydrogen bromide, hydrogen iodide, sulfuric acid, and the like. However, any acid, alone or in admixture with other acids, organic or inorganic, in aqueous or non-aqueous solution or emulsion, is suitable for use in my invention if it will react with alkali metal silicates to form silicic acid or some other acid silicate which, inherently or upon condensation or dehydration, forms an insoluble silicon compound. A typical acid concentration for aqueous hydrochloric acid solutions used would be about 10 percent, but higher or lower concentrations are satisfactory, as is true with all other acids used in my invention. The acid concentration is not critical, but sufficient acid must be injected to neutralize residual caustic alkali as well as to react with the in situ silicate. Excess acid does not affect the process of my invention.

The reaction of the acid and the alkali metal silicate causes the sand grains and particles to be consolidated by the creation and fusion of acid silicates which, upon dehydration, condense in such a manner as to establish a very permeable ceramic-type zone of consolidated formation surrounding the well bore. The conversion reaction to insoluble silicates can be carried to completion by prolonged dehydration treatment at low temperatures or by a much shorter subsequent treatment using hot or cold gases such as air, exhaust gases, or dry steam, e.g., air which has been heated to the vicinity of 160° F. or higher. The same flushing and dehydration treatment previously described are all applicable in this final dehydration step wherein at least a portion of the acid silicate is condensed by dehydration.

Subsequent to establishing the consolidated zone using the technique of my invention, the formation is returned to production in the normal manner as known in the art. This production is substantially free of sand grains and particles and yields increased production rates and favorable economics therefor. The previously incompetent formation is rendered consolidated, reaching or exceeding a strength comparable with the typical strength of competent native sandstone formations. Further, the permeability and porosity of the structure is returned to a level as great or almost as great as that obtainable from the previous incompetent sand formation thus permitting production to be accomplished at an extremely high rate without undesirable sand production.

It is believed that the mechanism of the process of my invention generally follows the reactions set forth in the following equations. Even though the actual mechanism may not be completely understood, or may be otherwise than as set forth below, I have conclusively demonstrated that the sequential treatment with caustic alkali, acid, and dehydrating fluid of an incompetent formation as set forth in my process results in a relatively strong consolidated formation having a high degree of permeability and porosity. It is to be understood that I do not wish to be bound by any particular theory as to the operation of my sand consolidation process and, therefore, propose this outline of the process chemistry only as one which might be taking place. In this illustration of the mechanism of the chemistry of my process, the caustic alkali used in the equations is sodium hydroxide and the acid used in the equations is hydrochloric acid, but other bases and other acids, as previously disclosed, are operable.

First, the silicon dioxide surface of the sand particles reacts with the sodium hydroxide solution to form a layer of sodium silicate in situ by etching or dissolving the surface as set forth in Equation 1:

(1)
$$SiO_2 + 2NaOH \xrightarrow{time} Na_2SiO_3 + H_2O$$

Then the sodium silicate formed in situ reacts with the hydrochloric acid to form silicic acid and sodium chloride as set forth in Equation 2:

(2) $Na_2SiO_3 + 2HCl + H_2O \rightarrow H_4SiO_4 + 2NaCl$

Then the silicic acid (acid silicate) condenses or, in other words, is dehydrated to form the water-insoluble silicon dioxide binder as set forth in Equation 3:

(3)
$$2H_4SiO_4 \xrightarrow[heat]{time} 2SiO_2 + 4H_2O$$

The rate of these reactions is a function of time, temperature, and concentration as is well known in the art. Increases in either time or temperature promotes the completion of these reactions. The silicon dioxide binder formed is water and hydrocarbon-insoluble, thus being an ideal bonding agent between the sand particles. Because of the method in which the sodium silicate is formed in situ by the etching of the surface of the sand particles and the formation of an extremely thin surface layer of sodium silicate, the method of my invention creates an extremely porous and permeable formation. As shown in FIGURE 2, the actual pore space between the sand particles is not decreased by the reactions as set forth above. Further, the bonding takes place only at the point of contact or of extreme proximity between the sand particles wherein the thin sodium silicate layers of each sand particle react at the point of contact to fuse into a common silicon dioxide bond between sand particles. Prior art processes all depend on covering the sand particles with additional layers of material thus increasing the particle size and decreasing the pore space between particles, and then bonding with a thick film of material deposited thereon by various means. Thus, all of the prior art processes provide heavily coated sand particles of greater size than the original particles as shown in FIGURE 3, thereby decreasing substantially the pore volume or, in other words, the space between the particles by this thick layer deposit technique.

The following examples are illustrative of the method and advantages of my invention but are not intended as a limitation thereof.

*Example I*

A one-inch inside diameter glass tube about two inches long was filled with uncompacted Nevada No. 70 sand, the bottom of the tube having a coarse fritted aloxite filter disc to contain the sand. This sand in the uncompacted dry state had an air permeability of about 15,000 millidarcies and a porosity or void volume of about 35% to 38%. Two pore volumes of 15% by weight sodium hydroxide distilled water solution was poured through the uncompacted said tube using a vacuum flask to draw the solution through the sand. The tube was placed in a covered jar with a lid, the jar containing about a ⅛-inch layer of distilled water on its bottom and the jar was placed in a 200° F. oven for 21 hours. The sand tube was then removed from the jar and dried in the oven at 300° F. for 3 hours. Two pore volumes of hydrochloric acid (about 38% by weight) was then poured through the sand. The core was then placed back in the oven for about 84 hours in a sealed jar with a lid as before. The sand tube was then removed from the jar and let dry in the oven for about 4 hours. This sample was well consolidated and very permeable to fluid flow having a porosity only slightly less from that of the uncompacted raw sand.

A further series of five sand tubes were treated in exactly the same manner as set forth above with the exception of the acid treatment phase. Instead of the hydrochloric acid treatment as set forth, the following acids were used in two pore volume amounts for reaction with the sodium silicate formed in situ: (1) phosphoric acid of about 86% by weight concentration; (2) a fluosilicic acid about 31% by weight concentration; (3) 50% each of acid (1) and 38% by weight hydrochloric acid; (4) 50% each of acids (1) and (2); (5) ⅓ part each of acids (1), (2), and the 48% by weight hydrochloric acid. Each of these tubes were sealed in jars with lids and placed in the oven for 84 hours. The tubes were removed from the jars and were let dry in the oven for about 4 hours. These samples all were hard, structurally sound cores which had a high degree of permeability also with a porosity only slightly less than that of the uncompacted raw sand.

*Example II*

A second series of six cores were prepared and treated in exactly the same manner as that set forth in Example I except that after being in the oven for a period of 21 hours after treatment with the sodium hydroxide solution, the samples were removed from the oven and, without the 3 hours of drying time as set forth in Example I, the acid solutions were poured in two pore volume quantities through the six samples using exactly the same acids as those used in Example I. The resulting cores were all satisfactorily consolidated and had permeabilities and porosities substantially identical to those of the resulting finished consolidated cores of Example I. However, these samples wherein there was no drying or dehydration step after treatment with the sodium hydroxide solution were not quite as strong from a core strength standpoint as the cores resulting from Example I wherein the drying step was conducted.

*Example III*

A sand tube, identical to that used in Example I, was filled with raw formation oil-containing sand. One pore volume of a 20% by weight sodium hydroxide distilled water solution was poured through this dirty sand. The sand tube was then placed in a sealed jar in a 215° F. oven for 64 hours. The sand tube was then removed from the jar and dried in the oven for 2 hours. Then, two pore volumes of the three acid mixture set forth in Example I as (5) comprising hydrochloric acid, phosphoric acid, and fluosilicic acid was poured through the core and the core was then placed back in the oven in a sealed jar for a period of 6 hours. The sample was then opened to the atmosphere and heated for a short time in the open oven to dry. This treatment resulted in a consolidated sand core which, although not having the strength of the clean Nevada sand cores of Example I and II, represented a perfectly satisfactory consolidation of a dirty sand into a core having a good permeability and a high degree of porosity.

A second sample of this dirty oil-wet sand was packed in a sand tube as set forth above, but prior to treatment with the sodium hydroxide was flushed with 5 milliliters of a mixture of benzene and toluene, and flushed with a 5 cc. portion of isopropanol, then dried. The sand appeared quite clean at this point. Two pore volumes of a 20% sodium hydroxide mixture was then passed through the core and the core was placed in a sealed jar, put in a 215° F. oven for 43 hours, dried for a short period of time in a 250° F. oven out of the sealed jar, and two pore volumes of the three acid mix from Example I, No. (5), was then passed through the core and the core was placed in the oven for drying for a period of about 18 hours. The resulting core was well consolidated, porous, and permeable to fluid flow.

*Example IV*

A sand tube sample prepared in exactly the same manner and with the same caustic treatment as that set forth in Example I was treated with an alternate acid system comprising passing two pore volumes of acid emulsion through the core, the acid emulsion comprising an emulsified mixture of two parts octylphenoxy polyethoxy ethanol, 28 parts of the three acid mix (5) from Example I, ten parts kerosene, 40 parts toluene, 5 parts isopropanol, and 15 parts distilled water. The acid-treated core was then placed in an oven at 200° F. for 18 hours resulting in a hard, well-consolidated core having a high degree of permeability and porosity.

*Example V*

In this test a 3-foot long glass tube was prepared in substantially the same manner as that set forth in Example I, the tube being about 1-inch in diameter and being filled with Nevada 70 sand. Then about 160 milliliters of a 20% by weight sodium hydroxide distilled water solution was passed through the core. The core was then placed in a 220° F. oven for 64 hours with stoppers being placed on each end of the 3-foot long glass tube. Then the tube was opened by removing the stoppers and dried for about 4 hours. Subsequently, about 160 milliliters of the three acid mix from Example I, acid (5) was passed through the core in the same direction as the sodium hydroxide solution had been passed. Then the tube was placed back in the oven at 220° F. for a period of about 2 hours with the ends of the tube closed. Then the stoppers closing the end of the tube were removed and the tube was heated another 16 hours with the ends open. The core was hard and dry throughout its length and was well consolidated, permeable, and had a porosity only slightly lower than that of the uncompacted raw sand.

*Example VI*

In this example a group of five sand tubes were prepared in substantially the identical manner as that set forth in Example I except that Nevada 130 sand replaced the Nevada 70 sand of Example I. Then the five samples were each treated with a different concentration of sodium hydroxide solution. The five solution concentrations used were (percent by weight of sodium hydroxide in distilled water): 15 percent, 12 percent, 10 percent, 8 percent, and 5 percent. These basic solutions were each passed through their respective cores and then the cores were placed in the oven in a sealed jar for a period of 16 hours at 220° F. The cores were then treated with two pore volumes of an acid emulsion comprising: 17 parts fluosilicic acid, 27 parts hydrochloric acid, and 56 parts isopropyl alcohol. The acid-treated cores were then placed in the open oven for a period of about 6 hours at 220° F. The 15% and 12% cores were somewhat stronger than the 10%, 8% and 5% cores, but all of the cores were well consolidated, permeable, and had a high degree of porosity only slightly less than that of the uncompacted Nevada 130 sand.

*Example VII*

In this example a well is drilled to a depth where the well bore contacts a fluid producing stratum of a formation wherein the formation comprises an unconsolidated sand. A 15% solution of sodium hydroxide in water is injected into the sand in an amount sufficient to penetrate the formation for about 6 feet radially from the well bore. The well is then shut in and allowed to set, the sodium hydroxide solution thus being permitted to react on the sand particles in the formation adjacent to the well bore. After a 4-hour period, the well is then injected with air at a pressure sufficient to partially dehydrate or dry the sodium silicate layer formed in situ on the sand particles. Then a dilute liquid mixture of hydrochloric acid, about 10% by weight, is injected in a quantity sufficient to neutralize the excess sodium hydroxide present and to react with the sodium silicate present to form silicic acid which ultimately forms the insoluble silicate binder in my sand consolidation process. Air at a temperature of about 200° F. is then injected into the well for a period of about 4 hours thus drying the silicic acid which by dehydration and condensation forms silicon dioxide, which is water and oil insoluble, as a binder. The well is then returned to production at a high level of formation fluid flow into the well bore, but with substantially no sand or solids flow into the well bore with the formation fluids.

As previously mentioned, an optional first step in my process can be a cleaning step such as subjecting the formation surrounding the well bore to in situ combustion followed by the sequential injection of caustic alkali, acid, dehydrating fluid, and then producing the well. A further satisfactory technique for cleaning the formation comprises subjecting the formation adjacent the well to a solvent wash to remove the petroleum materials from the sand particles followed by the aforementioned injection of caustic, acid, dehydrating fluid, and subsequent production of the formation.

Another technique for cleaning the sand particles in an incompetent formation prior to consolidation by my process comprises the use of conventional solvent washing to remove soluble materials from the sand grains and particles. Any solvent suitable for dissolution and removal of hydrocarbons can be used, such as carbon disulfide, acetone, benzene, other aromatic hydrocarbons, and the like. These solvents are injected under pressure to move the hydrocarbonaceous material away from the well bore, i.e., either to the surface or into the formation. Solvent flushing is continued until a sufficient amount of solvent has been injected to give the desired amount of cleaning, once again leaving a relatively clean, incompetent sand formation which can be readily consolidated by my invention. In the process of my invention, it is not critical that the incompetent sand formation be dry (free of water) since the initial step of my consolidation treatment uses an aqueous solution of an alkali metal hydroxide.

Various other changes and modifications of this invention are apparent from the description thereof and further modifications and variations will be obvious to those skilled in the art. Such modifications and changes are intended to be included within the scope of this invention as defined by the following claims.

I claim:

1. A method of consolidating loose sand which comprises:

contacting said loose sand with an aqueous basic solution;

permitting said aqueous basic solution to react with said sand;

contacting said reacted sand with an acid; and dehydrating at least a portion of said acid-contacted sand.

2. A process for consolidating an incompetent sand formation traversed by a well bore which comprises:

injecting an aqueous alkali metal hydroxide solution into said incompetent sand formation;

permitting said solution to react with said incompetent sand formation;

injecting an acid into said reacted sand formation; and injecting a first non-reactive fluid into said acid-injected sand formation to dehydrate at least a portion of said acid-injected sand formation thus forming a consolidated permeable porous sand formation.

3. The process of claim 2 wherein said incompetent sand formation is cleaned prior to the injection of said aqueous alkali metal hydroxide solution.

4. The process of claim 2 including an additional step immediately following said reaction of said sand formation with said aqueous alkali metal hydroxide solution comprising:

injecting a second non-reactive fluid into said reacted sand formation to at least partially dehydrate said reacted sand formation.

5. The process of claim 2 wherein said first non-reactive fluid injected into said formation is air.

6. The process of claim 1 wherein said aqueous basic solution is an aqueous solution of an alkali metal hydroxide.

7. The process of claim 2 wherein said alkali metal hydroxide is sodium hydroxide.

8. The process of claim 2 wherein said acid injected into said formation is a strong inorganic acid.

9. The process of claim 8 wherein said strong inorganic acid injected into the formation is selected from the group consisting of hydrochloric acid, fluosilicic acid, phosphoric acid, and mixtures thereof.

10. A process for consolidating an incompetent sand formation traversed by a well bore comprising:

injecting an aqueous sodium hydroxide solution into said incompetent sand formation;

permitting said aqueous sodium hydroxide solution to react with said incompetent sand formation;

injecting air into said reacted sand formation to at least partially dehydrate said reacted sand formation;

injecting an acid comprising a mixture of hydrochloric acid, fluosilicic acid, and phophoric acid into said partially dehydrated, reacted sand formation; and injecting air into said acid-injected sand formation to at least partially dehydrate said acid-injected sand formation.

References Cited by the Examiner

UNITED STATES PATENTS

| | | | |
|---|---|---|---|
| 1,842,186 | 1/1932 | McBerty | 264—43 |
| 2,374,035 | 4/1945 | Nutting | 23—110.1 |
| 2,881,049 | 4/1959 | Erbe et al. | 2—110.1 |
| 3,121,462 | 2/1964 | Martin et al. | 166—29 |
| 3,218,683 | 11/1965 | Nishiyama et al. | 22—193 |

CHARLES E. O'CONNELL, *Primary Examiner.*

D. H. BROWN, *Assistant Examiner.*